United States Patent [19]

Lesyk et al.

[11] 3,771,711

[45] Nov. 13, 1973

[54] COMPLIANT BONDING

[75] Inventors: Joseph N. Lesyk, Allentown; David P. Ludwig, Whitehall; Jack J. Monahan, Allentown, all of Pa.

[73] Assignee: Western Electric Company, Incorporated, New York, N.Y.

[22] Filed: Aug. 20, 1971

[21] Appl. No.: 173,447

[52] U.S. Cl. .......... 228/4, 29/471.1, 29/626, 228/6

[51] Int. Cl. .......... B23c 1/00

[58] Field of Search .......... 29/471.1, 592, 626, 29/493; 228/4, 5, 6, 44; 156/358; 219/78, 79; 74/520

[56] References Cited

UNITED STATES PATENTS

| | | | |
|---|---|---|---|
| 3,650,454 | 3/1972 | Coucoulas | 29/471.1 X |
| 3,640,444 | 2/1972 | Ludwig | 228/4 |
| 3,627,190 | 12/1971 | Ramsey | 228/4 |
| 3,607,550 | 9/1971 | Ballanger | 156/358 |
| 3,533,155 | 10/1970 | Coucoulas | 29/471.1 |
| 3,448,911 | 6/1969 | Cushman | 228/44 |
| 3,442,432 | 5/1969 | Santangini | 228/44 |

*Primary Examiner*—J. Spencer Overholser
*Assistant Examiner*—Robert J. Craig
*Attorney*—W. M. Kain et al.

[57] ABSTRACT

Compliant bonding of successive beam-lead semiconductor devices to successive metallic patterns on substrates is accomplished with a bonding apparatus that uses an indexable compliant member. A bonding head of the apparatus is provided with a single movable tip which disengages from the compliant member during indexing of the member. The movable tip engages with a portion of the compliant member that is suspended between two drive sprockets when it is desired to perform a bonding operation. The engagement of the tip with the compliant member produces tension in the member. The tension results in a precise and flat configuration within the engaged portion of the member. The flat configuration enhances accurate alignment of workpieces to the compliant member. A toggle linkage is described as a desirable system for moving the bonding tip with respect to the head.

4 Claims, 6 Drawing Figures

PATENTED NOV 13 1973 3,771,711

SHEET 1 OF 3

INVENTORS
J. N. LESYK
D. P. LUDWIG
J. J. MONAHAN
BY
ATTORNEY

COMPLIANT BONDING

BACKGROUND OF THE INVENTION

1. Field of the Invention

This invention relates to improved methods and apparatus for compliant bonding, and more particularly to methods and apparatus for producing compliant bonds between beam-lead semiconductor devices and metallic patterns on substrates.

2. Description of the Prior Art

When bonding beam-lead semiconductor articles, such as integrated-circuit chips, to substrates, it is highly advantageous to employ a technique known as compliant bonding. Compliant bonding is described in U. S. Pat. No. 3,533,155 issued to A. Coucoulas on Oct. 13, 1970.

A particularly efficient technique for adapting compliant bonding to high-speed production operations is described in patent application Ser. No. 863,259 filed in the name of D. P. Ludwig on Oct. 2, 1969, now U. S. Pat. No. 3,690,444, issued Feb. 8, 1972, and assigned to the assignee of record of this application. The system described in the Ludwig application involves sequentially placing an unused portion of a compliant bonding strip onto a bonding axis with each successive bonding operation. This is accomplished by preliminarily engaging the compliant member with portions of a heated turret-like bonding head and then subsequently rotating the bonding head to bring various bonding tips of the head into position on a bonding axis.

While the Ludwig system is fully workable, there is some desire to provide a bonding apparatus which will operate with not only all of the advantages of the Ludwig system, but also will operate with greater accuracy and reliability.

SUMMARY OF THE INVENTION

It is therefore an object of this invention to provide a bonding system which will facilitate compliant bonding with a sequentially indexable compliant bonding strip wherein such bonding is performed with a single bonding tip.

Another object of the invention is to accomplish such bonding without causing preliminary heating of a bonding portion of a compliant member before placing the portion in a bonding position.

These objects are achieved by utilizing bonding apparatus wherein a bonding head is provided with a single movable bonding tip. The tip is capable of being urged against a compliant member suspended across a portion of the bonding head to provide tension within the compliant member. The tip is selectively releasable from the compliant member to permit indexing of the compliant member across the bonding head.

BRIEF DESCRIPTION OF THE DRAWINGS

Other objects and features of the present invention will be more readily understood from the following detailed description of specific embodiments thereof, when read in conjunction with the appended drawings in which.

DETAILED DESCRIPTION

Figure 1:
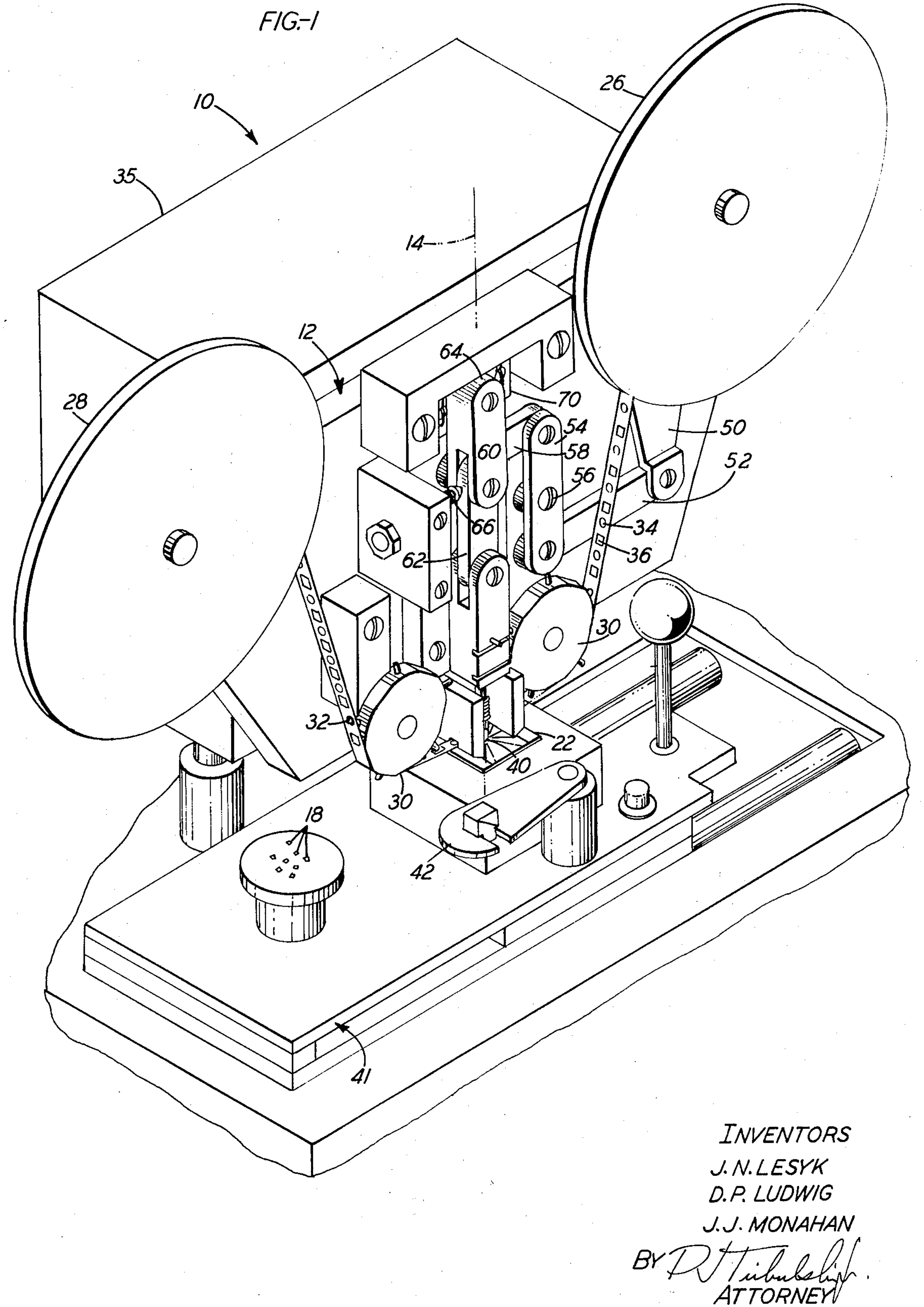
FIG. 1 is a perspective view of a bonding apparatus employing an inventive single-tip, indexable compliant-bonding head.
Figure 2:
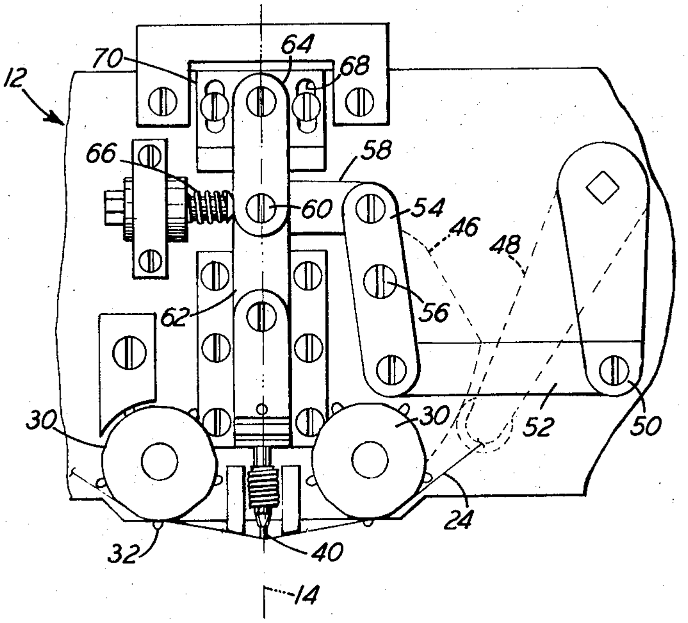
FIG. 2 is an elevational view of the inventive bonding head showing the movable bonding tip in an extended or engaged position.

A bonding machine, designated generally by the numeral 10, is illustrated in FIG. 1. The machine 10 includes a bonding head, designated generally by the numeral 12. The bonding head 12 is arranged to be moved up and down along a bonding axis 14.

The purpose of the bonding machine 10 is to provide sound thermocompression bonds between beam leads of semiconductor devices or chips, designated generally by the numeral 18, and metallic patterns formed on substrates 22. The desired bonding is accomplished by compressing the leads against the metallic pattern with a compliant strip or member 24 as described in Coucoulas U.S. Pat. No. 3,533,155 and the aforementioned D. P. Ludwig application Ser. No. 863,259 now U.S. Pat. No. 3,690,444.

As described in the Ludwig application, it is desirable to perform each bonding operation with an unused portion of the compliant member 24. Thus, it is convenient to operate the machine 10 with a continuous strip of the compliant member which is continuously supplied from a reel 26 and wound onto a reel 28.

Figure 6:
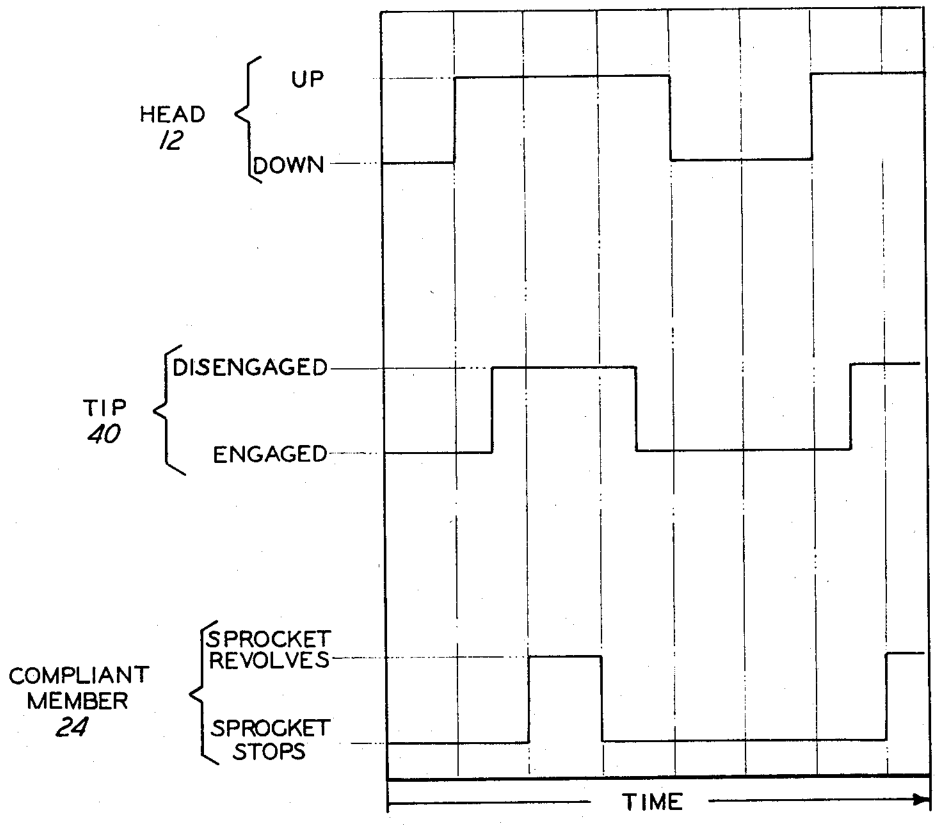
FIG. 6 is a timing diagram showing the interrelation of various mechanical motions of the machine of FIG. 1.

The machine 10 operates in accordance with a timing sequence illustrated in FIG. 6.

The operation involves indexing of the compliant member 24 across the bonding head 12. This is accomplished by driving the member 24 with sprockets 30. Each of the sprockets 30 is provided with projections 32 which engage with sprocket holes 34 punched in the compliant member 24. A conventional drive system 35 is provided to index the sprockets 30 in predetermined rotational steps to accomplish an accurate positioning of successive bonding apertures 36 onto the bonding axis 14.

After one of the apertures 36 is positioned on the bonding axis 14, the drive system 35 brings a heated bonding tip 40 to bear against the compliant member 24 to produce tension in that portion of the member which is suspended between the two sprockets 30. One of the chips 18 is then positioned on the bonding axis 14 by an operator using a conventional manipulator assembly, designated generally by the numeral 41, and a prism-type optical system 42 combined with a microscope (not shown). The aligned chip 18 is engaged with the compliant member 24 by utilizing a vacuum source (not shown) operating through a vacuum port 44 in the bonding tip 40 (see FIG. 3). One of the substrates 22 is then aligned to the engaged chip 18 using the conventional manipulator assembly 41.

After alignment of the chip 18 and the metallic pattern of the substrate 22, the bonding head 12 is lowered along the axis 14 to accomplish compliant bonding between the leads and the metallic pattern. Upon completion of the bond, the head 12 is raised and the tip 40 is released from the compliant member 24, thereby eliminating the tension in the span of the member between the sprockets 30. The sprockets 30 are rotatably indexed to bring a subsequent one of the apertures 36 into the bonding axis 14 and a new cycle of bonding begins.

It can be readily seen that the portion of the member 24 which is to be involved in bonding is not subjected to any heating until that portion is positioned on the bonding axis 14. The portion of the member 24 engaged with the sprockets 30 remains at ambient temperature. Since the sprockets 30 engage with a portion of the member 24 at ambient temperature there is no need to allow for thermal expansion differentials which occur when the compliant member is formed of a material different than the sprockets 30. The inventive design of the machine 10 provides accurate indexing of the compliant member 24 irrespective of the coefficient of thermal expansion of the material used for the member 24.

FIGS. 2 through 5 illustrate one desirable embodiment of the bonding head 12 in which the bonding tip 40 is movable with respect to the head to alternately produce and release tension within the span of the compliant member 24 suspended between the sprockets 30. The head 12 illustrated in FIGS. 2 through 5 utilizes a toggle linkage to move the bonding tip 40 along the axis 14.

A cam 46 operates the toggle linkage by driving a cam follower arm 48 outwardly when it is desired to lower the bonding tip 40 along the axis. The follower arm 48 is connected to a link 50 which is, in turn, connected to a link 52 which is, still in turn, connected to a pivotal link 54 that pivots about a pivot screw 56. As the link 54 rotates in a counterclockwise direction, a horizontal connecting link 58 positions a toggle pivot point 60 onto the bonding axis 14. When the point 60 is on the bonding axis, toggle bar members 62 and 64 are aligned with the axis and the bonding tip 40 is in its lowermost position. A spring-biased catch assembly 66 provides the necessary snap action to the toggle operation.

The vertical position of the toggle members 62 and 64 is adjustable through slotted holes 68 in a member 70 to which the toggle member 64 is mounted. By adjusting the vertical position of the toggle members 62 and 64, the position of the bonding tip 40 can be accurately controlled.

Figure 3:
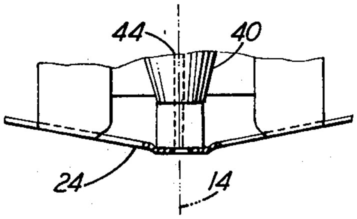
FIG. 3 is an enlarged view of an encircled portion of the bonding tip of FIG. 2.

When the tip 40 is engaged with the compliant member 24, as shown in FIG. 3, the engaged portion of the compliant member can be accurately aligned to the semiconductor chips 18 and the substrates 22 for bonding. It is necessary to provide the tension-induced engagement between the member 24 and the tip 40 in order to establish a uniformly flat surface across the engaged portion of the compliant member. If the compliant member 24 were not flat and tightly engaged with the tip 40, it would be virtually impossible to achieve accurate alignment between the chips 18 and the metallic pattern of the substrates 22.

Figure 4:
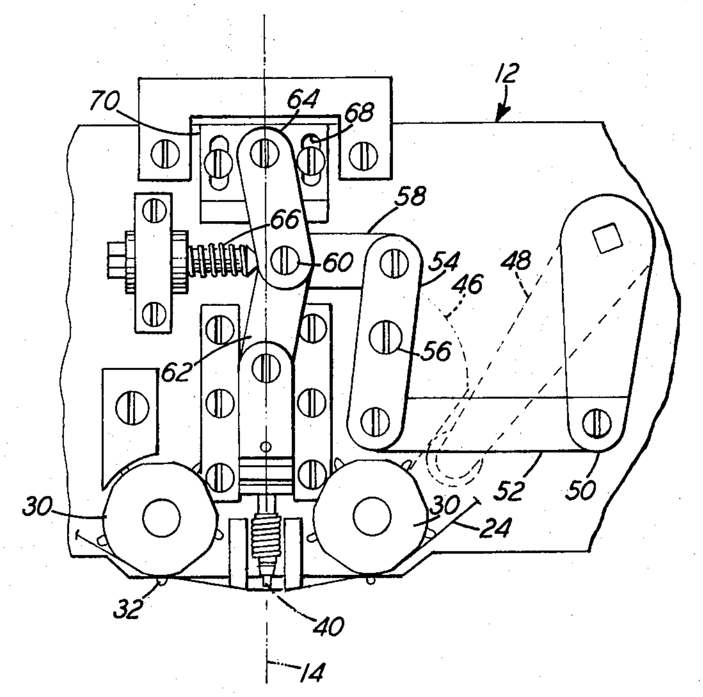
FIG. 4 is an elevational view of the bonding head of FIG. 2 showing a bonding tip in an retracted or disengaged position.
Figure 5:
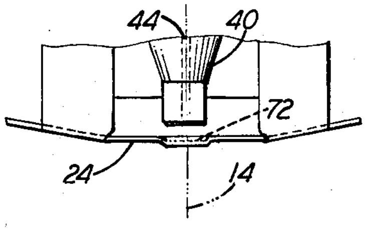
FIG. 5 is an enlarged view of an encircled portion of the bonding tip of FIG. 4.

It is apparent that indexing of the compliant member 24 cannot be accomplished when there is a tight engagement between the compliant member and the tip 40. Thus, it is necessary to release the tip 40 from the compliant member 24 after a bond is completed so that an unused portion of the compliant member can be brought onto the bonding axis 14. The release of the bonding tip 40 as shown in FIGS. 4 and 5 is accomplished by further rotation of the cam 46 to permit the cam follower arm 48 to move inwardly. The inward motion of the cam follower arm 48 reverses the movement of the various linkage members and causes the toggle assembly to shorten and thus retract the bonding tip 40.

Additional advantages in achieving precise alignment can be derived from pre-forming or embossing the compliant member with pocket-like depressions 72 within the area of the bonding aperture 36. Such an arrangement is illustrated in FIGS. 3 and 5. The depressions 72 help to position the bonding apertures 36 with respect to the bonding tip 40 when the tip is engaged with the member 24. Additionally the structural configuration of the depressions 72 provides an increased probability for achieving perfectly flat contact between the tip 40 and the member 24.

It is to be understood that the toggle mechanism described for moving the bonding tip 40 with respect to the head 12 is only one of a number of possible arrangements that can be used for accomplishing the desired motion.

Although certain embodiments of the invention have been shown in the drawings and described in the specification, it is to be understood that the invention is not limited thereto, is capable of modification and can be arranged without departing from the spirit and scope of the invention.

What is claimed is:

1. Apparatus for compliantly bonding successive articles, which comprises:

a bonding head adapted to move toward and away from a bonding site along a bonding axis, said bonding head having a bonding tip thereon adapted for relative movement with respect to said head;

means on the bonding head for suspending a strip of compliant bonding material;

means on the bonding head for incrementally moving portions of the strip across the bonding head synchronously with the motion of the bonding head; and means for periodically engaging the bonding tip with the compliant strip to develop tension therein and to provide intimate contact between the tip and the engaged portion of the strip, said means being operable synchronously with the means for moving the strip to permit free travel of the strip during motion thereof and to provide a desirable contact between the strip and the tip during a bonding operation, and said engaging means comprising a toggle linkage, which when fully extended is axially aligned with the bonding axis.

2. Apparatus for compliantly bonding successive articles, which comprises:

a bonding head adapted to move toward and away from a bonding site along a bonding axis, said bonding head having a bonding tip thereon adapted for relative movement with respect to said head;

means on the bonding head for suspending a strip of compliant bonding material;

means on the bonding head for incrementally moving portions of the strip across the bonding head synchronously with the motion of the bonding head; and means for periodically engaging the bonding tip with the compliant strip to develop tension therein and to provide intimate contact between the tip and the engaged portion of the strip, said means being operable synchronously with the means for moving the strip to permit free travel of the strip during motion thereof and to provide a desirable contact between the strip and the tip during a bonding operation, and said strip having pocket-like depressions formed into the portion of the strip adjacent bonding apertures of the strip, said depressions facilitating a precise flat engagement between the tip and the compliant strip.

3. Apparatus for compliant bonding, wherein a compliant member is indexably positionable between a bonding tip and a workpiece to be bonded which comprises:

means for indexing the compliant member relative to the tip; and means for sequentially operating the bonding tip to engage it with the compliant member to bond the workpiece and to release it from the compliant member to enable the indexing means to index the compliant member relative to the tip, said engaging means comprising a toggle linkage, which when fully extended is axially aligned with the bonding axis.

4. Apparatus for compliant bonding, wherein a compliant member is indexably positionable between a bonding tip and a workpiece to be bonded which comprises:

means for indexing the compliant member relative to the tip; and means for sequentially operating the bonding tip to engage it with the compliant member to bond the workpiece and to release it from the compliant member to enable the indexing means to index the compliant member relative to the tip, said compliant member being in the form of an enclosed compliant strip, said strip having pocket-like depressions formed into the portion of the strip adjacent bonding apertures of the strip, said depressions facilitating a precise flat engagement between the tip and the compliant strip.

* * * * *